United States Patent
Rateiczak et al.

(10) Patent No.: US 9,484,651 B2
(45) Date of Patent: Nov. 1, 2016

(54) PANE HAVING AN ELECTRICAL CONNECTION ELEMENT

(71) Applicant: SAINT-GOBAIN GLASS FRANCE, Courbevoie (FR)

(72) Inventors: Mitja Rateiczak, Wuerselen (DE); Bernhard Reul, Herzogenrath (DE); Klaus Schmalbuch, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/421,993

(22) PCT Filed: Jul. 24, 2013

(86) PCT No.: PCT/EP2013/065561
§ 371 (c)(1),
(2) Date: Feb. 16, 2015

(87) PCT Pub. No.: WO2014/029576
PCT Pub. Date: Feb. 27, 2014

(65) Prior Publication Data
US 2015/0236438 A1    Aug. 20, 2015

(30) Foreign Application Priority Data
Aug. 24, 2012    (EP) .................................... 12181663

(51) Int. Cl.
*H05B 3/08* (2006.01)
*H01R 13/02* (2006.01)
(Continued)

(52) U.S. Cl.
CPC ............. *H01R 13/02* (2013.01); *B23K 1/0016* (2013.01); *B23K 1/20* (2013.01); *H01R 43/02* (2013.01); *H01R 43/0235* (2013.01); *Y10T 29/49169* (2015.01)

(58) Field of Classification Search
CPC .. H01R 13/02; H01R 43/0235; H01R 43/02; B23K 1/0016; B23K 1/20; Y10T 29/49169
See application file for complete search history.

(56) References Cited

U.S. PATENT DOCUMENTS

| 2005/0045700 A1 | 3/2005 | Winter et al. |
| 2006/0147337 A1 | 7/2006 | Boaz et al. |

(Continued)

FOREIGN PATENT DOCUMENTS

| EP | 2339894 | 6/2011 |
| JP | 2009504411 A | 2/2009 |

(Continued)

OTHER PUBLICATIONS

International Preliminary Report on Patentability issued on Feb. 24, 2015 for PCT/EP2013/065561 filed on Jul. 24, 2013 in the name of Saint-Gobain Glass France.

(Continued)

*Primary Examiner* — Shawntina Fuqua
(74) *Attorney, Agent, or Firm* — Steinfl & Bruno LLP

(57) ABSTRACT

A pane having a connection element, having; a substrate having an electrically conductive structure on at least a subregion of the substrate, the electrical connection element on at least a subregion of the electrically conductive structure, and a lead-free soldering compound which connects the electrical connection element to the electrically conductive structure in at least a subregion, wherein the lead-free soldering compound contains 58 to 62% by weight indium, 35 to 38% by weight tin, 1 to 3.5% by weight silver and 0.5 to 2% by weight copper.

18 Claims, 4 Drawing Sheets

A - A'

Figure 1:
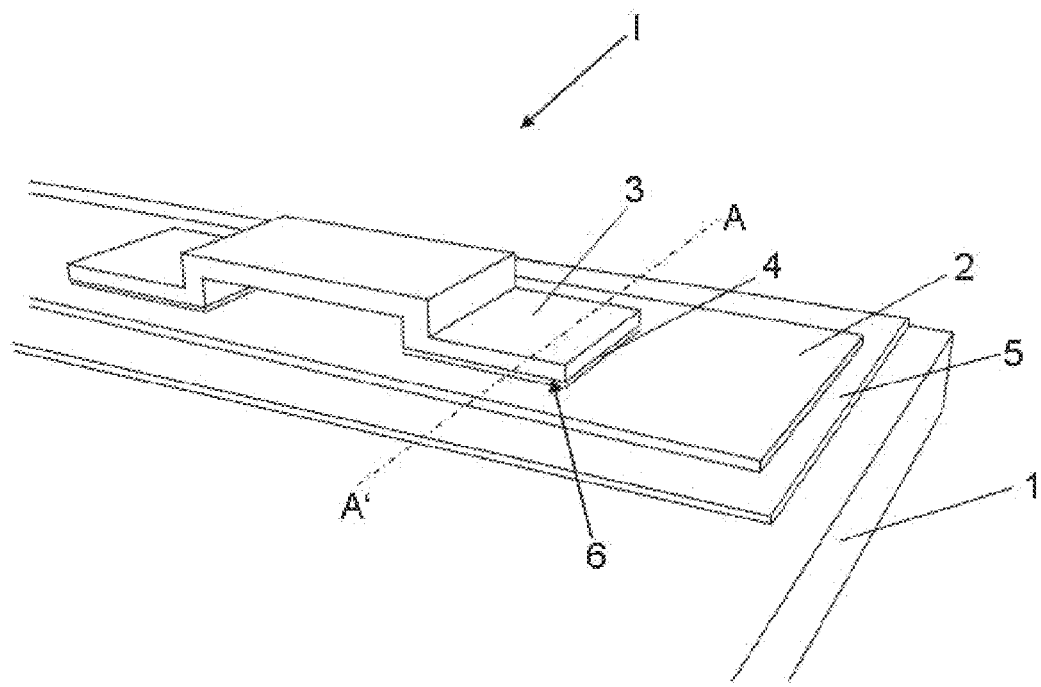

(51) Int. Cl.
  *H01R 43/02* (2006.01)
  *B23K 1/00* (2006.01)
  *B23K 1/20* (2006.01)

(56) References Cited

U.S. PATENT DOCUMENTS

| | | |
|---|---|---|
| 2007/0105412 A1 | 5/2007 | Hoepfner et al. |
| 2008/0175748 A1* | 7/2008 | Pereira ............ B23K 1/0008 420/555 |
| 2010/0321758 A1* | 12/2010 | Bugno ............ B60R 1/088 359/267 |
| 2012/0205152 A1 | 8/2012 | Rateiczak et al. |

FOREIGN PATENT DOCUMENTS

| | | |
|---|---|---|
| JP | 2012091216 A | 5/2012 |
| KR | 20080063712 A | 7/2008 |
| WO | 0058051 | 10/2000 |
| WO | 2007/021326 A2 | 2/2007 |
| WO | 2011145591 | 11/2011 |

OTHER PUBLICATIONS

PCT International Search Report issued for PCT application PCT/EP2013/065561 filed on Jul. 24, 2013 in the name of Saint-Gobain Glass France. mailed: Aug. 20, 2013.

* cited by examiner

PANE HAVING AN ELECTRICAL CONNECTION ELEMENT

CROSS REFERENCE TO RELATED APPLICATIONS

The present application is the US national stage of International Patent Application PCT/EP2013/065561 filed internationally on Jul. 24, 2013 which, in turn, claims priority to European Patent Application No. 12181663.1 filed on Aug. 24, 2012.

The invention relates to a pane with an electrical connection element, an economical and environmentally friendly method for its production, and its use.

The invention further relates to a pane with an electrical connection element for motor vehicles with electrically conductive structures such as, for instance, heating conductors or antenna conductors. The electrically conductive structures are customarily connected to the onboard electrical system via soldered-on electrical connection elements. Due to different coefficients of thermal expansion of the materials used, mechanical stresses occur during production and operation that strain the panes and can cause breakage of the pane.

Lead-containing solders have high ductility that can compensate the mechanical stresses occurring between an electrical connection element and the pane by plastic deformation. However, because of the End of Life Vehicles Directive 2000/53/EC, lead-containing solders have to be replaced by leadfree solders within the EC. The Directive is referred to, in summary, by the acronym ELV (End of Life Vehicles). Its objective is, as a result of the massive increase in disposable electronics, to ban extremely problematic components from products. The substances affected are lead, mercury, cadmium, and chromium. This relates, among other things, to the implementation of leadfree soldering materials in electrical applications on glass and the introduction of corresponding replacement products.

Leadfree solder compositions known from electronic applications are unsuitable for application on glass. For one thing, higher adhesive strength, which is not obtained with these solder compositions, is necessary on glass. For another, the flexible solders used for electronic substrates have a relatively high coefficient of thermal expansion, as a result of which glass breakage occurs quite readily with relatively great temperature fluctuations.

For example, leadfree metal alloys containing silver, tin, zinc, indium, bismuth, and/or gallium are disclosed for use on glass. EP 2 339 894 A1 describes the use of bismuth alloys for soldering a conductive layer on a pane with a connection element. However, since such bismuth alloys are very brittle, they are not optimally suited for soldering in combination with glass substrates and excessively high tensile stresses occur at the solder point.

Another possibility for reducing the tensile stresses at the solder point is the addition of coarse-grained additives. US 2006/0147337 A1 discloses, for example, a tin-silver alloy, to which a granular nickel-iron alloy is added. Thus, the coefficient of thermal expansion of the solder can be significantly reduced.

Moreover, the use of a wide variety of indium alloys is known for the contacting of glass. Indium has proved to be a particularly suitable material since, thanks to its low hardness, it reduces the tensile stresses at the solder point. WO 2000058051 discloses an alloy containing 65 wt.-% indium, 30 wt.-% tin, 4.5 wt.-% silver as well as 0.5 wt.-% copper. The solder composition described has, due to its high indium content, a comparatively low melting point of ca. 121° C., as a result of which an excessive transfer of heat to the glass substrate during the soldering operation can be prevented. At the same time, however, such a low melting point degrades the aging resistance of the soldering compound, such that, with strong heating of the solder point, for example, with incident sunlight and simultaneous use of the heating function of the pane, damage to the solder point can occur. Moreover, inhomogeneities of the soldering compound, such as, for example, encapsulations of the flux, can be observed, which, depending on their extent, could cause a structural failure of the soldered joint. In addition, this solder composition has unfavorable wetting behavior from which the poor homogeneity of the soldering compound as well as a formation of cavities result.

The object of the present invention is to provide an improved pane with a connection element, which does not have the disadvantages of the prior art, and an environmentally friendly method for its production.

The object of the present invention is accomplished according to the invention by a pane with a connection element, a method for its production, and its use according to the independent claims 1, 12, and 13. Preferred embodiments are apparent from the subclaims.

The pane according to the invention comprises a substrate with an electrically conductive structure on at least a subregion of the substrate, an electrical connection element on at least a subregion of the electrically conductive structure, and a leadfree soldering compound, which electrically conductively connects the electrical connection element to the electrically conductive structure in at least one subregion. The leadfree soldering compound contains 58 weight percent (wt.-%) to 62 wt.-% indium and 35 wt.-% to 38 wt.-% tin. In particular, the soldering compound according to the invention comprises 58.0 wt.-% to 62.0 wt.-% indium and 35.0 wt.-% to 38.0 wt.-% tin. Tin serves, due to its mechanical properties and its good wetting properties, as an essential component of the solder and is primarily used as a filler, with the tin content determined by the contents of the remaining components such that all components total 100%. The strict observance of the indium content is, however, extremely important since even small variations affect the quality of the soldering compound and the particularly advantageous properties of the soldering compound occur only in the range indicated.

The leadfree soldering compound can be used in accordance with the EC Directive "2002/95/EC on the Restriction of the Use of Certain Hazardous Substances in Electrical and Electronic Equipment" as an alternative to lead-containing solders and contains, in compliance with the Directive, a maximum of the limit value of 0.1 wt.-% lead, preferably no lead. This is particularly advantageous with regard to the environmental impact of the pane according to the invention. Leadfree soldering compounds typically have lower ductility than lead-containing soldering compounds such that mechanical stresses between a connection element and a pane can be less well compensated. However, it has been demonstrated that the leadfree soldering compound according to the invention is particularly well-suited for processing in combination with glass substrates.

In a particularly preferred embodiment of the pane according to the invention, the leadfree soldering compound contains 59 wt.-% to 61 wt.-% indium and 35 wt.-% to 38 wt.-% tin.

Added to the leadfree soldering compound are 1 wt.-% to 3.5 wt.-% silver (in particular 1.0 wt.-% to 3.5 wt.-% silver), preferably 1.5 wt.-% to 3 wt.-% silver (in particular 1.5 wt.-% to 3.0 wt.-% silver). For one thing, silver reduces the migration of silver atoms out of the adjacent materials, such as, for example, the conductive structure, into the solder. For another, the addition of silver increases the mechanical strength of the leadfree soldering compound and helps to avoid fatigue phenomena caused by temperature fluctuations.

Added to the leadfree soldering compound is a content from 0.5 wt.-% to 2 wt.-% copper (in particular 0.5 wt.-% to 2.0 wt.-% copper), preferably 0.8 wt.-% to 1.8 wt.-% copper, particularly preferably 1.2 wt.-% to 1.7 wt.-% copper, in particular 1.4 wt.-% to 1.6 wt.-% copper. This copper content causes a lowering of the melting point, increases the aging resistance against temperature fluctuations, and improves the wetting properties of the solder. In the case of use of copper-containing components that come into direct contact with the soldering compound, the copper content, furthermore, prevents the migration of copper atoms from those components into the solder.

Moreover, nickel can also be contained in the leadfree soldering compound. Preferably, nickel is used at a maximum content of 1 wt.-%. Nickel serves to avoid intermetallic phases, such as, for example, $Ag_6Sn$ and $Ag_3Sn$, which will make the solder harder and more brittle. For this, even a nickel content of 0.1 wt.-% to 0.2 wt.-% suffices. However, the nickel content can also be 0 wt.-%.

Furthermore, bismuth, zinc, antimony, gold, aluminum, arsenic, cadmium, chromium, carbon, manganese, niobium, titanium, germanium, iron, and/or phosphorus can be contained in the leadfree soldering compound, with the maximum contents of cadmium and chromium complying with the limit values in accordance with EC Directive 2002/95/EC.

The soldering compound composition according to the invention contains most particularly preferably In60Sn36.5Ag2.0Cu1.5, In60Sn36.4Ag2.0Cu1.5Ni0.1, In59Sn36.5Ag3.5Cu1.0, In61Sn35.5Ag2.0Cu1.5, In61Sn37.5Ag1.0Cu0.5, In60Sn37.4Ag2.5Ni0.1, in particular In60Sn36.5Ag2.0Cu1.5.

The production-related fluctuation range of the solder composition is 1% based on the respective total amounts of the individual components used.

The substrate preferably contains glass, particularly preferably flat glass, float glass, quartz glass, borosilicate glass, and/or soda lime glass. Alternatively, the substrate can contain polymers, preferably polyethylene, polypropylene, polycarbonate, polymethyl methacrylate, and/or mixtures thereof.

The connection element preferably includes copper, zinc, titanium, iron, nickel, cobalt, molybdenum, tin, manganese, and/or chromium and/or alloys thereof, such as, for example, brass, bronze, steel, nickel silver, Constantan, Invar, Kovar. Particularly preferably, the connection element contains steel, in particular stainless steel, for example, the rust-free stainless steel marketed under the trade name "Nirosta". In an alternative embodiment, the connection element contains 58.0 wt.-% to 99.9 wt.-% copper and 0 wt.-% to 37 wt.-% zinc. The brass alloy Cu70Zn30 is mentioned here as an example. However, the particularly advantageous composition of the leadfree soldering compound enables the use of a wide variety of materials as the connection element. Depending on the material of the connection element, the composition of the soldering compound according to the invention is also adapted, on the one hand, to ensure optimum adhesion of the connection element and, on the other, to keep material costs as low as possible. In the case of connection elements with a high copper content, high-indium solder compositions must be used; whereas, for example, in the case of stainless steel connection elements, even lower-indium solder compositions can be used. A low-indium solder in the context of the soldering compound composition according to the invention thus results, in conjunction with a connection element made of stainless steel, in a significant reduction of material costs, since the content of expensive indium can be reduced. Such a synergistic effect between the connection element and the solder can only be obtained through precise coordination of the materials of the connection element and the solder composition. The soldering compound has, in the case of use with a stainless steel connection element, very good processability and stability.

In order to obtain the highest possible resistance of the soldered joint to temperature fluctuations, the coefficients of thermal expansion of the soldering partners involved and of the solder should be in the same order of magnitude. For this reason, the use of stainless steel connection elements is recommended since these have coefficients of thermal expansion similar to the soldering compound according to the invention. A pane including a substrate made of soda lime glass, a connection element made of stainless steel, and the soldering compound composition according to the invention is thus particularly advantageous with regard to the stability of the soldered joint in the event of temperature fluctuations.

The connection element preferably has a coating, particularly preferably a silver-containing coating or a nickel-containing coating. The coating preferably has a thickness from 2 µm to 5 nm. In particular, silver-plated or nickel-plated connection elements are used, with the silver plating or nickel plating improving the surface quality, the conductivity, and the wettability of the surface. In particular, connection elements made of stainless steel are preferably silver-plated or nickel-plated.

The pane according to the invention can include connection elements of a variety of shapes, for example, bridge-shaped connection elements, which contact the electrically conductive structure on two or more surfaces, or also plate-shaped connection elements, which are connected to the electrically conductive structure via a continuous support surface.

The connection element has at least one contact surface, via which the connection element is connected over its entire area to a subregion of the electrically conductive structure by means of the leadfree soldering compound.

In at least one subregion of the pane, an electrically conductive structure is applied, which preferably contains silver, particularly preferably silver particles and glass frits. The electrically conductive structure according to the invention preferably has a layer thickness from 3 µm to 40 µm, particularly preferably from 5 µm to 20 µm, most particularly preferably from 7 µm to 15 µm, and in particular from 8 µm to 12 µm. The connection element is connected over its entire area to a subregion of the electrically conductive structure via a contact surface. The electrical contacting is done by means of the leadfree soldering compound. The electrically conductive structure can, for example, serve for the contacting of wires mounted on the pane or of a coating. The electrically conductive structure is mounted, for example, in the form of busbars on opposite edges of the pane. A voltage can be applied via the connection elements mounted on the busbars, whereupon a current flows from one busbar to the other through the conductive wires or the coating and heats the pane. Alternatively to such a heating function, the pane according to the invention can also be used in combination with antenna conductors or is also conceivable in any other configurations in which a stable contacting of the pane is required.

The leadfree soldering compound flows out of the intermediate space between the connection element and the electrically conductive structure, with the solder describing a concave meniscus and thus forming a homogeneous solder fillet. Such a homogeneous solder fillet can be attributed primarily to the extraordinarily good wetting properties of the solder composition according to the invention. The formation of homogeneous fillets represents a quality criterion for the soldered joint since, in this case, a homogeneous distribution of the solder in the gap between the connection element and the electrically conductive structure can be assumed. If the solder flows unevenly out of the gap in form of solder beads, the solder beads can result in damage to the surface of the electrically conductive structure. In order to ensure a good soldered joint even in the case of solders with poor wetting properties, these are often used in large quantities such that a high solder thickness is produced. However, the risk of a soldering compound crossover is also great. Not only do the solder beads described appear, but the soldering compound can, moreover, bulge upward on the side surfaces of the connection element all the way to its upper surface such that the sides of the connection element are completely surrounded by soldering compound. However, such soldered joints are extremely unstable during temperature fluctuations. The good wetting properties of the solder according to the invention are thus extremely advantageous with regard to the stability and quality of the soldered joint and also with regard to resource-sparing and cost-effective use of raw materials.

The shape of the electrical connection element can form solder depots in the intermediate space of the connection element and the electrically conductive structure. The solder depots and wetting property of the solder on the connection element prevent the outflow of the soldering compound from the intermediate space. Solder depots can be implemented rectangular, rounded, or polygonal.

In order to obtain uniform layer thickness of the leadfree soldering compound, the connection element can have spacers on its contact surface. One or a plurality of spacers, preferably at least two spacers, particularly preferably at least three spacers can be mounted on the contact surface. The spacers preferably have a width from 0.1 mm to 3 mm and a height from 0.05 mm to 1 mm, particularly preferably a width from 0.3 mm to 1 mm and a height from 0.2 mm to 0.4 mm. The spacers preferably correspond in their composition to the composition of the connection element itself and can be implemented in a wide variety of shapes, for example, as cubes, pyramids, or even as spherical segments or ellipsoid segments. The spacers are preferably implemented in one piece with the connection element, for example, by reshaping a connection element with an originally planar contact surface, for example, by stamping or deep drawing.

The layer thickness of the leadfree soldering compound is preferably less than or equal to 600 nm, particularly preferably less than 300 µm.

The introduction of energy during the electrical connecting of an electrical connection element and an electrically conductive structure is done preferably with punches, thermodes, piston soldering, microflame soldering, preferably laser soldering, hot air soldering, induction soldering, resistance soldering, and/or with ultrasound.

The invention further comprises a method for producing the pane according to the invention, wherein the leadfree soldering compound is first applied on the contact surfaces of the connection element. Preferably, the leadfree soldering compound is used as platelets, spheres, cones, cylinders, or ellipsoids or even as a segment of these bodies with a fixed layer thickness, volume, and shape, with the solder quantity designed such that outflow of the soldering compound during the soldering operation is avoided as much as possible. After that, an electrically conductive structure is applied on one region of the substrate and the connection element is arranged together with the leadfree soldering compound on the electrically conductive structure. Then, the connection element is connected to the electrically conductive structure by soldering. In the soldering operation, halogen-free fluxes (No Clean Flux) are used in the customary form. The flux can, for example, be contained in the interior of a solder depot or applied directly on the contact surfaces between the soldering compound and the connection element or the electrically conductive structure.

Preferably, before the application of the electrically conductive structure, black printing is applied on the edge region of the pane such that, after the installation of the pane, it conceals the connection elements.

After installation on the pane, the connection element is welded or crimped to a sheet, a stranded wire, or a braid, for example, made of copper, and connected to the onboard electronics.

The invention further includes the use of the pane according to the invention with electrically conductive structures in motor vehicles, architectural glazing, or structural glazing, in particular in automobiles, railroad vehicles, aircraft, or maritime vessels. A connection element is used for the connection of the electrically conductive structures of the pane, such as, for example, heating conductors or antenna conductors, to external electrical systems, such as, for example, amplifiers, control units, or voltage sources.

In the following, the invention is explained in detail with reference to drawings. The drawings in no way restrict the invention.

They depict:

FIG. 1 an embodiment of the pane according to the invention with a connection element.

Figure 2:
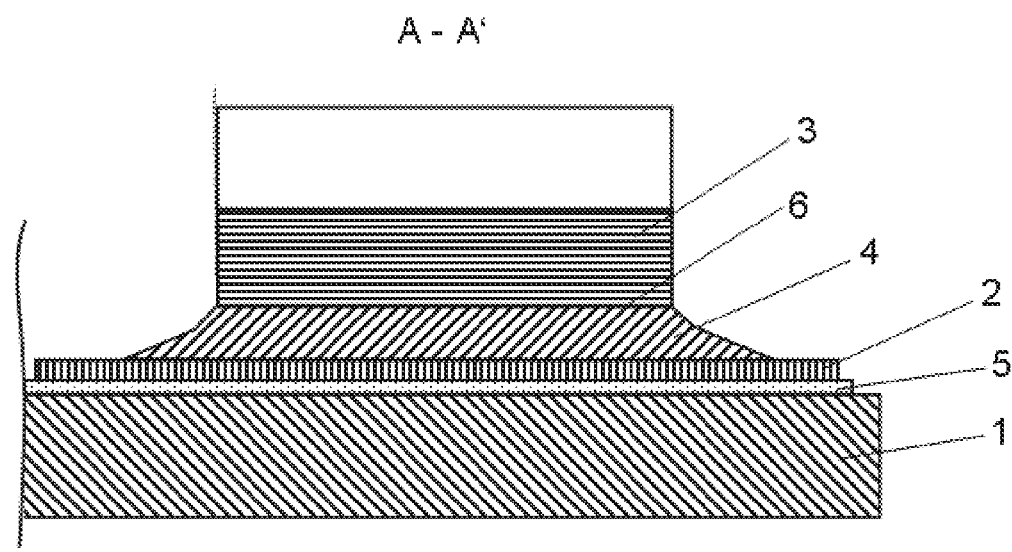

FIG. 2 a cross-section A-A' through the pane according to the invention with a connection element of FIG. 1.

Figure 3:
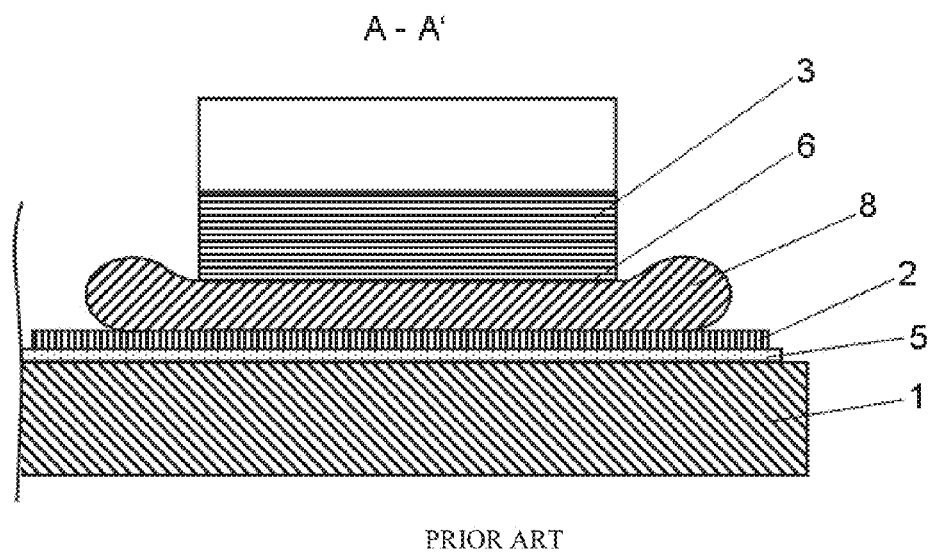

FIG. 3 a cross-section A-A' through a pane with a connection element according to the prior art.

Figure 4:
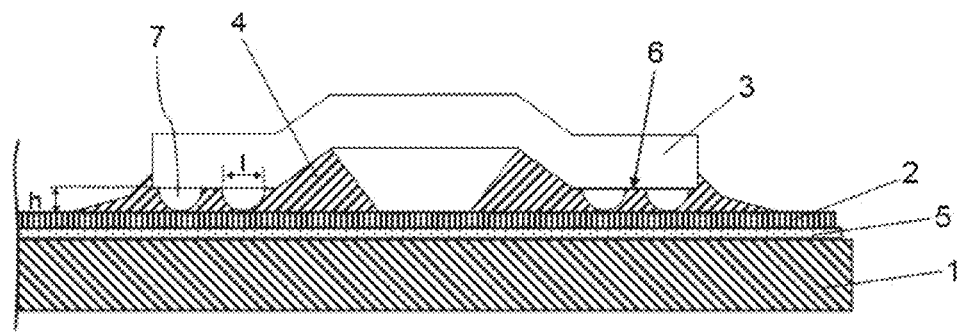

FIG. 4 an alternative embodiment of the pane according to the invention.

Figure 5:
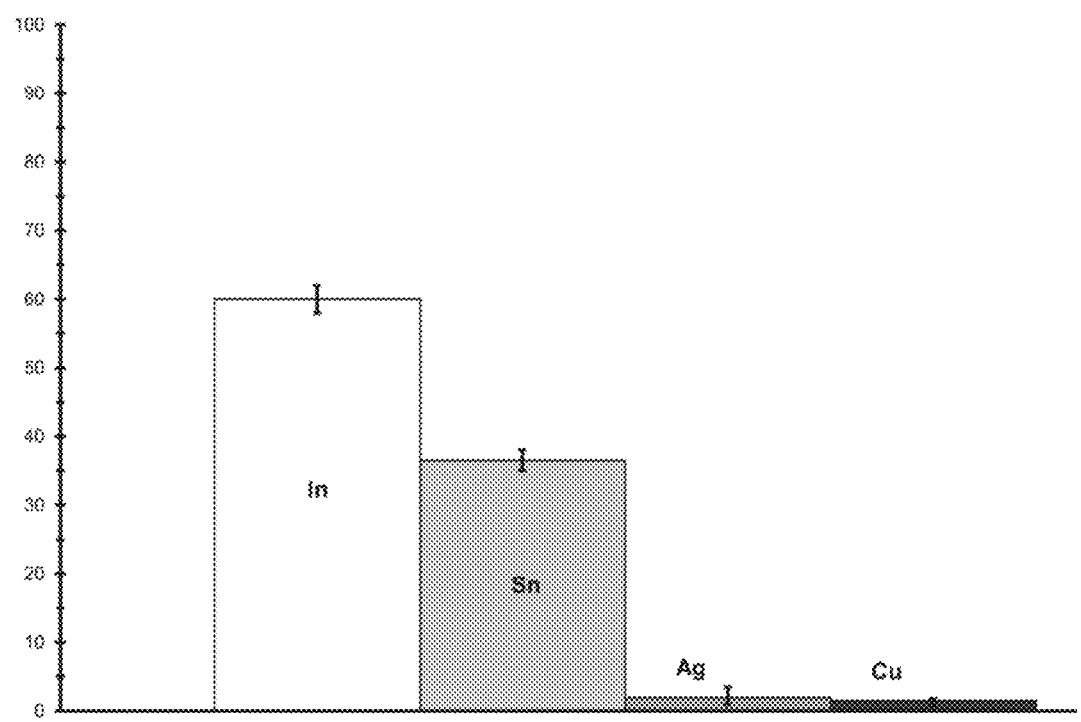

FIG. 5 the leadfree solder composition according to the invention.

Figure 6:
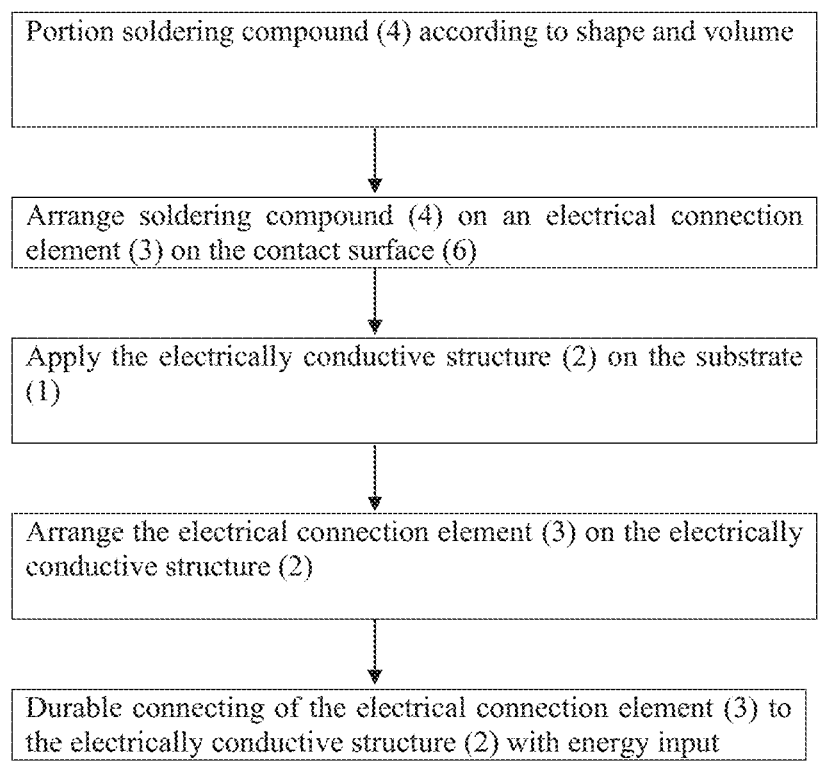

FIG. 6 a flowchart of the method according to the invention.

FIG. 1 depicts a pane (I) according to the invention with a connection element (3). A masking screenprint (5) is applied on a substrate (1) made of a 3-mm-thick thermally prestressed single plane safety glass made of soda lime glass. The substrate (1) has a width of 150 cm and a height of 80 cm, with a connection element (3) mounted on the shorter side edge in the region of the masking screenprints (5). An electrically conductive structure (2) in the form of a heating conductor structure is applied on the surface of the substrate (1). The electrically conductive structure contains silver particles and glass frits, with the silver content greater than 90%. The electrically conductive structure (2) is widened to 10 mm in the edge region of the pane (I). In this region, a leadfree soldering compound (4), which connects the electrically conductive structure (2) to a contact surface (6) of the connection element (3), is applied. After installation in the motor vehicle body, the contacting is concealed by the masking screenprint (5). The leadfree soldering compound (4) ensures a durable electrical and mechanical connection of the electrically conductive structure (2) to the connection element (3). The leadfree soldering compound (4) is arranged by a predefined volume and predefined shape completely between the electrical connection element (3) and the electrically conductive structure (2). The leadfree soldering compound (4) contains 60 wt.-% indium, 36.5 wt.-% tin, 2.0 wt.-% silver, and 1.5 wt.-% copper. In the case of this exemplary leadfree soldering compound (4), as precise a composition as possible of 60.00 wt.-% indium, 36.50 wt.-% tin, 2.00 wt.-% silver, and 1.50 wt.-% copper is selected. The leadfree soldering compound (4) has a thickness of 250 μm. The electrical connection element (3) is made of stainless steel. The electrical connection element (3) has a width of 4 mm and a length of 24 mm. Surprisingly, the combination of a leadfree soldering compound (4) according to the invention and a stainless steel connection element has good stability and quality of the soldered joint. It has been demonstrated that the properties of relatively high-indium solders (such as, for example, In65Sn30Ag4.5Cu0.5) with regard to stability and quality of the soldered joint can also at least be obtained even with a relatively low-indium solder (In60Sn36.5Ag2Cu1.5). Relatively low-indium solders are, however, advantageous with regard to resource-sparing and cost-effective use of raw materials. In addition, the soldering compound according to the invention demonstrates improved wetting behavior (cf. FIG. 2 and FIG. 3). A simple reduction of the indium content, with this being replaced by a filler such as tin does not suffice. Since the individual components of the soldering compound react with each other, with the modification of one component, the contents of other components must also be adapted, or different or additional components can be necessary to obtain similar properties. Thus, in the search for new soldering compounds, there are a large number of variables such that simple series of experiments do not suffice to solve this problem. The advantageous properties mentioned of the soldering compound composition In60Sn36.5Ag2Cu1.5 were surprising and unexpected for the person skilled in the art.

FIG. 2 depicts a cross-section A-A' through the pane (I) according to the invention with a connection element (3) in accordance with FIG. 1. The leadfree soldering compound (4) flows out laterally from the gap between the electrically conductive structure (2) and the connection element (3). The leadfree soldering compound (4) according to the invention forms a concave meniscus because of its very good wetting properties. The formation of such a homogeneous solder fillet is an indication of the fact that the solder has good flow and wetting properties, and thus a homogeneous distribution without cavity formation is present even in the gap between the connection element and the electrically conductive structure. With soldering compounds with poorer wetting properties solder beads frequently form, which can damage the electrically conductive structure; or there is such strong outflow of soldering compound that the soldering compound completely surrounds the side edges of the connection element, which results in a weakening of the soldered joint. Thanks to the excellent wetting characteristics and the very good flow behavior of the leadfree soldering compound (4), these effects can be completely avoided, which yields enormous advantages with regard to the quality and stability of the soldered joint. Moreover, the leadfree soldering compound (4) according to the invention can be used, due to its particularly good flow behavior, in a significantly thinner layer thickness, whereas the soldering compounds known from the prior art must be used in high layer thicknesses (above 600 μm) in order to guarantee adequate quality of the soldered joint. In contrast, with the leadfree soldering compound (4) according to the invention, the optimal layer thickness for a specific connection geometry can be freely selected, with a homogeneous structure being obtained even with thin layer thicknesses. A saving of soldering compound is also useful with regard to resource-sparing and cost-effective use of raw materials.

These results were surprising and unexpected for the person skilled in the art.

FIG. 3 depicts a cross-section A-A' through a pane (I) with a connection element (3) known according to the prior art. The soldering compound (8) according to the prior art contains 65 wt.-% indium, 30 wt.-% tin, 4.5 wt.-% silver, and 0.5 wt.-% copper. The general structure of the pane consisting of a substrate (1), a masking screenprint (5), an electrically conductive structure (2), a connection element (3), and the soldering compound (8) is analogous to that of the pane according to the invention. The soldering compound (8) is applied on the electrically conductive structure (2) and bonds it to the contact surface (6) of the connection element (3). Due to the poor wetting properties of the soldering compound (8), it oozes in the form of drops out of the gap between the electrically conductive structure (2) and the connection element (3), forming a convex meniscus. Solder beads that can cause damage to the silver layer develop and thus contribute to a failure of the soldered joint. Besides this uncontrollable oozing out from the gap, such unfavorable wetting behavior of the soldering compound (8) brings with it poor homogeneity.

FIG. 4 depicts, in continuation of the exemplary embodiment of FIGS. 1 and 2, an alternative embodiment of the pane according to the invention (I) with a connection element (3), wherein the connection element (3) has spacers (7) on the contact surface (6). The connection element (3) has a bridge-shaped structure analogous to the connection element depicted in FIG. 1, wherein two surfaces of the connection element (3) are implemented oblique to the substrate surface. In this embodiment, both planar sections of the contact element (3) and oblique surfaces are used as a contact surface (6), which is in direct contact with the leadfree soldering compound (4). The spacers (7) are arranged in the planar sections of the connection element (3) and touch the electrically conductive structure (2) directly such that the connection element (3) is held at a uniform distance therefrom. This favors the formation of a uniform soldering compound layer. The hemispherical spacers (7) have a height h of 0.25 mm and a width of 0.5 mm.

FIG. 5 depicts the leadfree solder composition according to the invention. The leadfree soldering compound (4) according to the invention contains 58 wt.-% to 62 wt.-% indium, 35 wt.-% to 38 wt.-% tin, 1 wt.-% to 3.5 wt.-% silver, and 0.5 wt.-% to 2.0 wt.-% copper. The higher the indium content of the solder composition, the lower the melting point and the higher the ductility of the solder. In order to obtain the most optimal flow properties possible with, at the same time, high temperature resistance, indium contents from 58 wt.-% to 62 wt.-%, preferably 59 wt.-% to 61 wt.-%, are particularly suitable. Most particularly preferably, the leadfree soldering compound (4) contains an indium content from 59.5 wt.-% to 60.5 wt.-%. Tin serves, in the leadfree soldering compound (4) according to the invention, primarily as an advantageous filler with good flow properties. The silver content of the soldering compound according to the invention serves to prevent migration of silver atoms out of the electrically conductive structure (2) into the soldering compound and simultaneously lowers the melting point. However, the silver content should be kept as low as possible in light of this undesirable lowering of melting point and for reasons of cost. A silver content from 1 wt.-% to 3.5 wt.-%, preferably 1.5 wt.-% to 3 wt.-%, has proven to be particularly suitable. By means of the addition of copper to the leadfree soldering compound (4), the melting point can be conclusively adjusted. Copper also provides for a certain malleability of the solder and prevents the elution of the copper content of the soldering partners. The leadfree soldering compound (4) according to the invention contains between 0.5 wt.-% and 2 wt.-% copper, preferably between 0.8 wt.-% and 1.8 wt.-% copper. Furthermore, a small content of nickel, a maximum of 1 wt.-%, preferably between 0.1 wt.-% and 0.2 wt.-% nickel, can be added to the soldering compound. Thus, the formation of intermetallic phases between tin and silver is avoided. A most particularly preferred solder composition is depicted in FIG. 5 in the form of bars and consists of 60.0 wt.-% indium, 36.5 wt.-% tin, 2.0 wt.-% silver, and 1.5 wt.-% copper.

FIG. 6 depicts a flowchart of the method according to the invention for producing the pane according to the invention (I) with a connection element (3). In a first step, the leadfree soldering compound (4) is portioned and arranged on the contact surface (6) of the electrical connection element (3). An electrically conductive structure (2) is applied on the substrate (1), for example, in the form of printed-on wires. A region of the electrically conductive structure (2) is formed wider such that the dimensions of this region correspond to at least the dimensions of the connection element (3). After that, the electrical connection element (3) with the leadfree soldering compound (4) is positioned on the electrically conductive structure (2), preferably in its wider formed region. The leadfree soldering compound (4) contacts the electrically conductive structure (2). By means of energy input, the electrical connection element (3) is durably connected electrically and mechanically to the electrically conductive structure (2).

LIST OF REFERENCE CHARACTERS

I pane
1 substrate
2 electrically conductive structure
3 connection element
4 leadfree soldering compound
5 masking screenprint
6 contact surface
7 spacer
8 soldering compound
A-A' section line
h height of the spacer 7
l width of the spacer 7

The invention claimed is:

1. A pane with at least one connection element at least comprising:
 a substrate with an electrically conductive structure on at least one subregion of the substrate,
 at least one electrical connection element on at least one subregion of the electrically conductive structure, and
 a leadfree soldering compound, which connects the electrical connection element to the electrically conductive structure in at least one subregion,
 wherein the leadfree soldering compound contains 58 wt.-% to 62 wt.-% indium, 35 wt.-% to 38 wt.-% tin, 1 wt.-% to 3.5 wt.-% silver, and 1.2 wt.-% to 1.7 wt.-% copper.

2. The pane according to claim 1, wherein the leadfree soldering compound contains 59 wt.-% to 61 wt.-% indium, and 35 wt.-% to 38 wt.-% tin.

3. The pane according to claim 1, wherein the leadfree soldering compound contains 1.5 wt.-% to 3 wt.-% silver.

4. The pane according to claim 1, wherein the leadfree soldering compound contains up to 1 wt.-% nickel.

5. The pane according to claim 1, wherein the substrate contains glass or polymers, and/or mixtures thereof.

6. The pane according to claim 1, wherein the connection element contains copper, zinc, titanium, iron, nickel, cobalt, molybdenum, tin, manganese, and/or chromium and/or alloys thereof.

7. The pane according to claim 6, wherein the connection element contains steel.

8. The pane according to claim 1, wherein the electrically conductive structure contains silver.

9. The pane according to claim 1, wherein the connection element is connected over its entire area to a subregion of the electrically conductive structure via a contact surface.

10. The pane according to claim 1, wherein the layer thickness of the leadfree soldering compound is less than or equal to 600 μm.

11. A method for producing the pane according to claim 1, comprising:
 applying the leadfree soldering compound to the bottom of the connection element,
 applying an electrically conductive structure to a substrate,
 arranging the connection element with the soldering compound on the electrically conductive structure, and
 soldering the connection element to the electrically conductive structure.

12. A method comprising:
 using the pane according to claim 1 as a pane for motor vehicles, aircraft, ships, architectural glazing, and structural glazing.

13. The pane according to claim 1, wherein the leadfree soldering compound contains 1.4 wt.-% to 1.6 wt.-% copper.

14. The pane according to claim 4, wherein the leadfree soldering compound contains up to 0.1 wt.-% to 0.2 wt.-% nickel.

15. The pane according to claim 5, wherein the glass is flat glass, float glass, quartz glass, borosilicate glass or soda lime glass.

16. The pane according to claim 5, wherein the polymer is polyethylene, polypropylene, polycarbonate or polymethyl methacrylate.

17. The pane according to claim 7, wherein the connection element contains stainless steel.

18. The method according to claim 12, further comprising:
 using the pane according to claim 1 as a pane with heating conductors and/or antenna conductors.

* * * * *